E. SCHMIDT, GEB. WALTER.
MACHINE FOR CUTTING BREAD.
APPLICATION FILED MAR. 24, 1913.

1,092,751.

Patented Apr. 7, 1914.

WITNESSES

INVENTOR
Else Schmidt
BY
ATTORNEYS

UNITED STATES PATENT OFFICE.

ELSE SCHMIDT, GEB. WALTER, OF BERLIN-TEGEL, GERMANY.

MACHINE FOR CUTTING BREAD.

1,092,751.

Specification of Letters Patent. Patented Apr. 7, 1914.

Application filed March 24, 1913. Serial No. 756,389.

*To all whom it may concern:*

Be it known that I, ELSE SCHMIDT, geb. WALTER, a subject of the King of Prussia, residing at Berlin-Tegel, in the Kingdom of Prussia and German Empire, have invented a new and useful Improved Machine for Cutting Bread, of which the following is a specification.

My invention relates to a machine for cutting bread. Said machine is provided with a knife adapted to operate like a lever, the loaf of bread to be cut being placed on a grid consisting of rods, which, when the machine is in use, are at right angles to the knife. The ends of the rods are secured to standards, to one of which the knife is pivoted. The advantage of this construction consists in the fact that the loaf being fed to the knife moves in the direction of the length of the rods, thus with but little resistance. Said rods are preferably so connected with the standards that the grid can be folded together, thus to occupy a position at an acute angle to the knife. The machine, when so folded, can be better stored away, for example in the side-board, so that this construction of the machine is specially suitable for household purposes.

Figure 1:
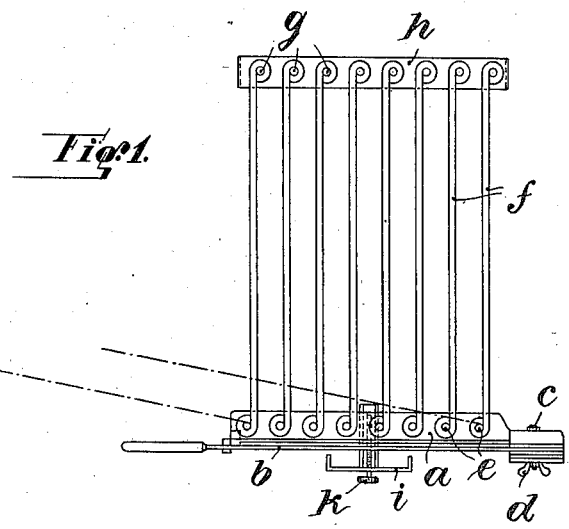

On the drawing a machine constructed according to the invention is shown by way of example: Figure 1 being a plan, and Fig. 2, a side elevation of the same.

To the standard $a$ the lever knife $b$ is pivoted by the bolt $c$ and thumb-screw $d$. With the same standard the rods $f$ are attached by the rivets $e$, the opposite ends of which rods are attached by the rivets $g$ to the standard $h$. Said rivets $e$ and $g$ enable the rods $f$ to be partly turned, so that the grid formed by these rods and the standards $a$ and $h$, as shown in dotted lines, can be folded together toward one side, the standard $h$ thus approaching the standard $a$, the length of the apparatus being then much reduced.

Figure 2:
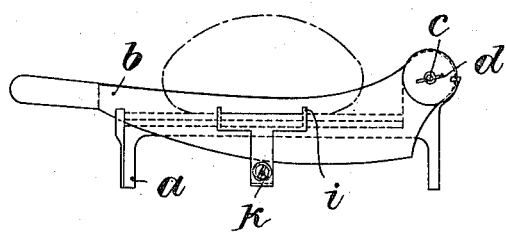

In Fig. 2 the position of the loaf of bread on the grid is shown in dot and dash lines. The end of said loaf presses against a bar $i$, the distance of which from the knife $b$ can be adjusted by a screw $k$ according to the thickness of the slice required.

What I claim and desire to secure by Letters Patent of the United States is:—

The herein described machine for cutting loaves of bread, comprising in combination, spaced standards, parallel rods, each having its ends pivoted to said standards, and a knife pivoted to one of said standards at right angles to said rods, substantially as, and for the purpose, set forth.

In testimony whereof I have signed my name to this specification in the presence of two subscribing witnesses.

FRAU ELSE SCHMIDT, GEB. WALTER.

Witnesses:
HENRY HASPER,
WOLDEMAR HAUPT.

---

Copies of this patent may be obtained for five cents each, by addressing the "Commissioner of Patents, Washington, D. C."